United States Patent [19]
Le Caz

[11] Patent Number: 5,823,620
[45] Date of Patent: Oct. 20, 1998

[54] VEHICLE SEAT HAVING LUMBAR SUPPORT

[75] Inventor: Christian Le Caz, Meaux, France

[73] Assignee: Lear Corporation, Southfield, Mich.

[21] Appl. No.: 847,829

[22] Filed: Apr. 17, 1997

[51] Int. Cl.[6] .................................................. A47C 7/46
[52] U.S. Cl. .................... 297/284.4; 297/284.2; 297/284.3; 297/284.8; 74/502.4; 74/502.6
[58] Field of Search ............................ 297/284.2, 284.4, 297/284.3, 284.8, 284.7; 74/500.5, 501.5 R, 502.6, 502.4

[56] References Cited

U.S. PATENT DOCUMENTS 5,076,643  12/1991  Colasanti et al. .
5,088,790   2/1992  Wainwright et al. .

*Primary Examiner*—Peter M. Cuomo
*Assistant Examiner*—Anthony D Barfield
*Attorney, Agent, or Firm*—MacMillan, Sobanski & Todd, LLC

[57] ABSTRACT

An automobile seat backrest includes an adjustable lumbar support assembly for selectively applying pressure to the lower area of a seated occupant's back. The backrest portion has a structural frame and a wire mesh within the frame for supporting a foam cushion. A cover envelopes the frame, wire mesh and cushion. First and second cranks are moveably supported on the wire mesh within the cover of the backrest portion. Cantilever arms extend from the respective first and second cranks to carry corresponding first and second applicator pads. A manual actuator causes the applicator pads to move in a synchronized fashion toward respective extended positions applying outward pressure to the cover. The manual actuator includes a twist knob which controls a worm gear, and a drum having gear teeth that mesh with the worm gear. A conduit extends from the actuator to the first crank, and a core element, slidably disposed within the conduit, interconnects the twist knob and the second crank. The actuator simultaneously applies a tensile force along the core element and a complimentary compressive force along the conduit to move the first and second cranks and to thereby displace the first and second applicator pads in unison against the cover, thus providing variable lumbar support to a seated occupant.

20 Claims, 3 Drawing Sheets

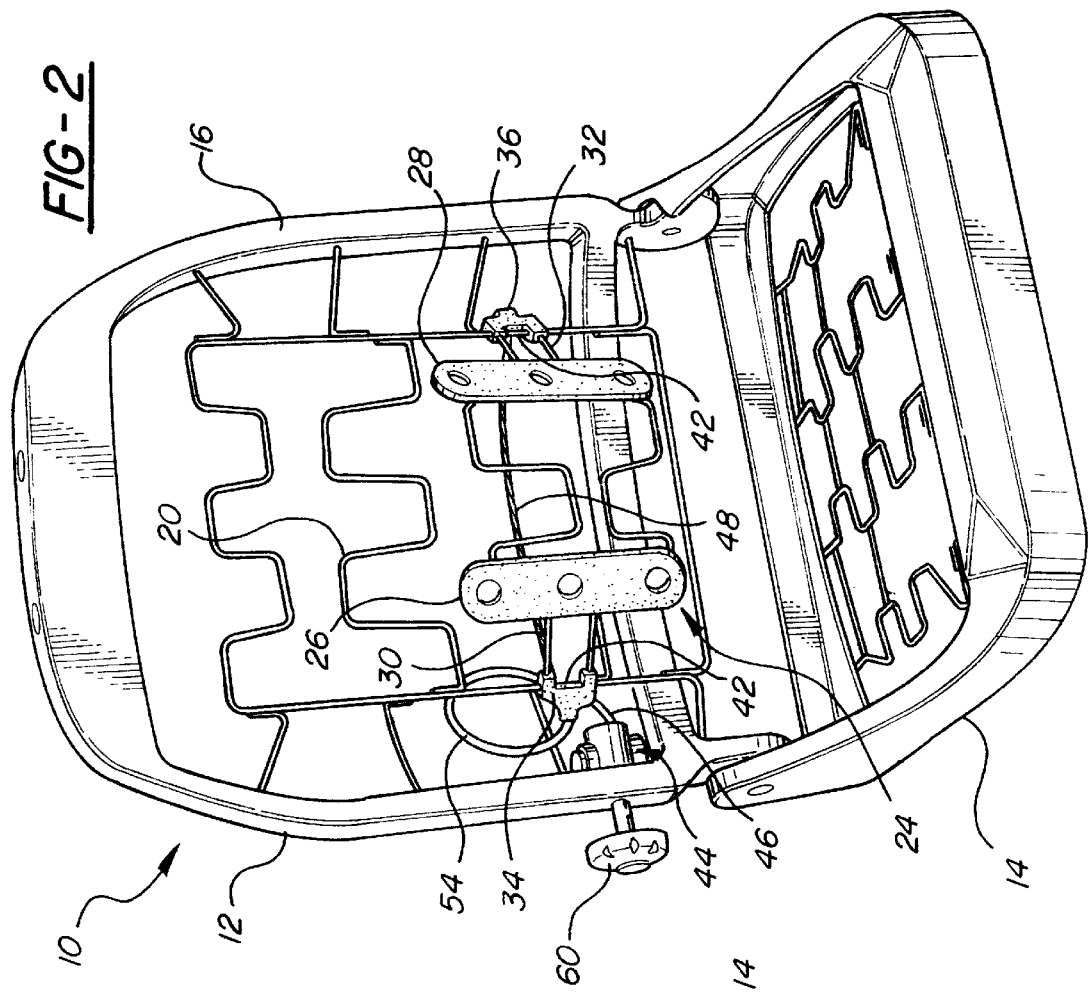
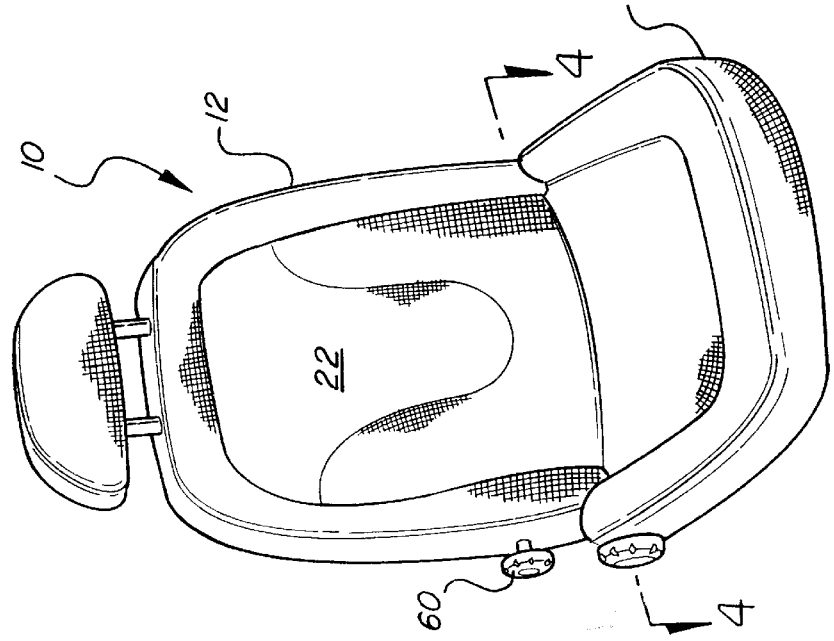

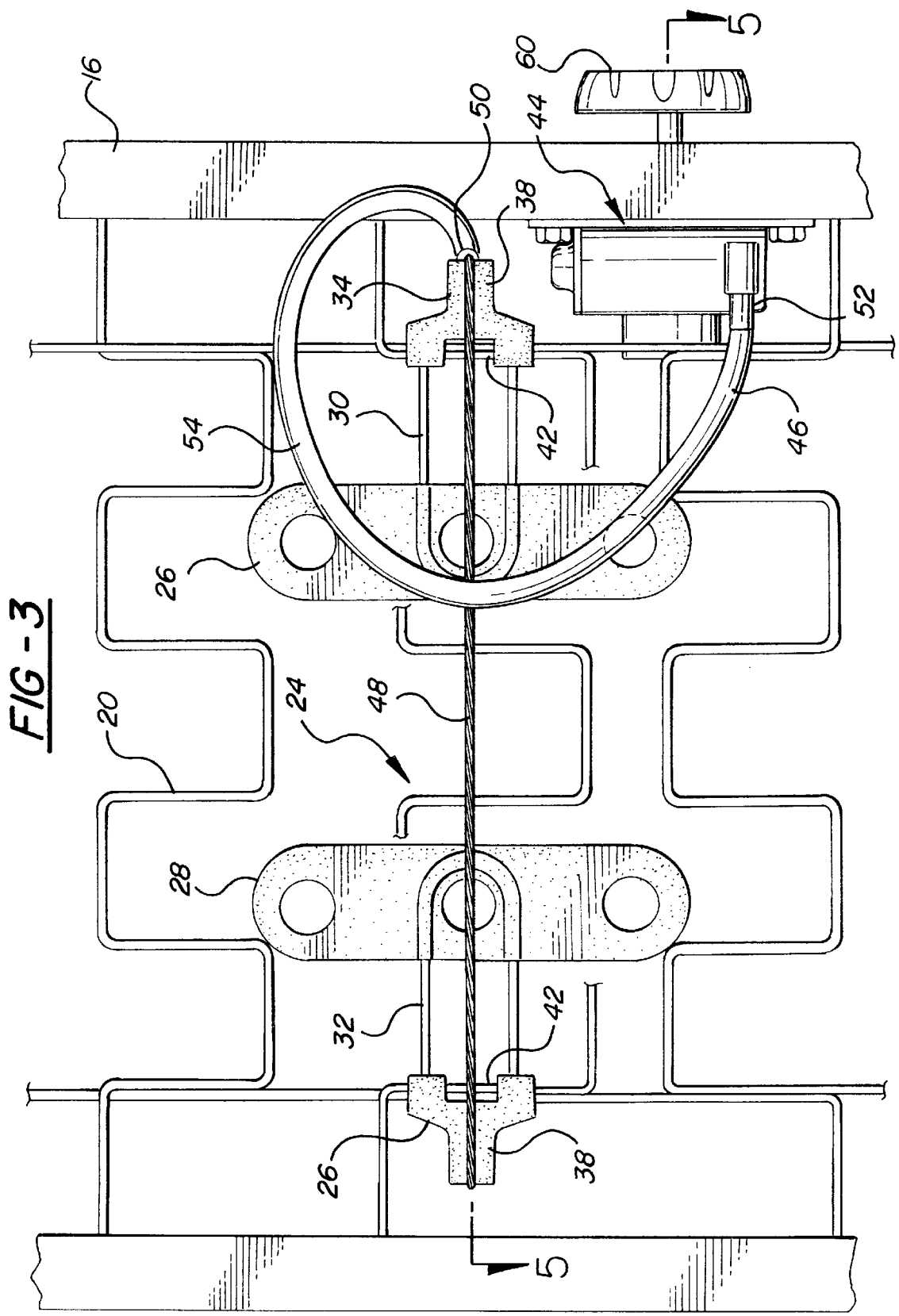

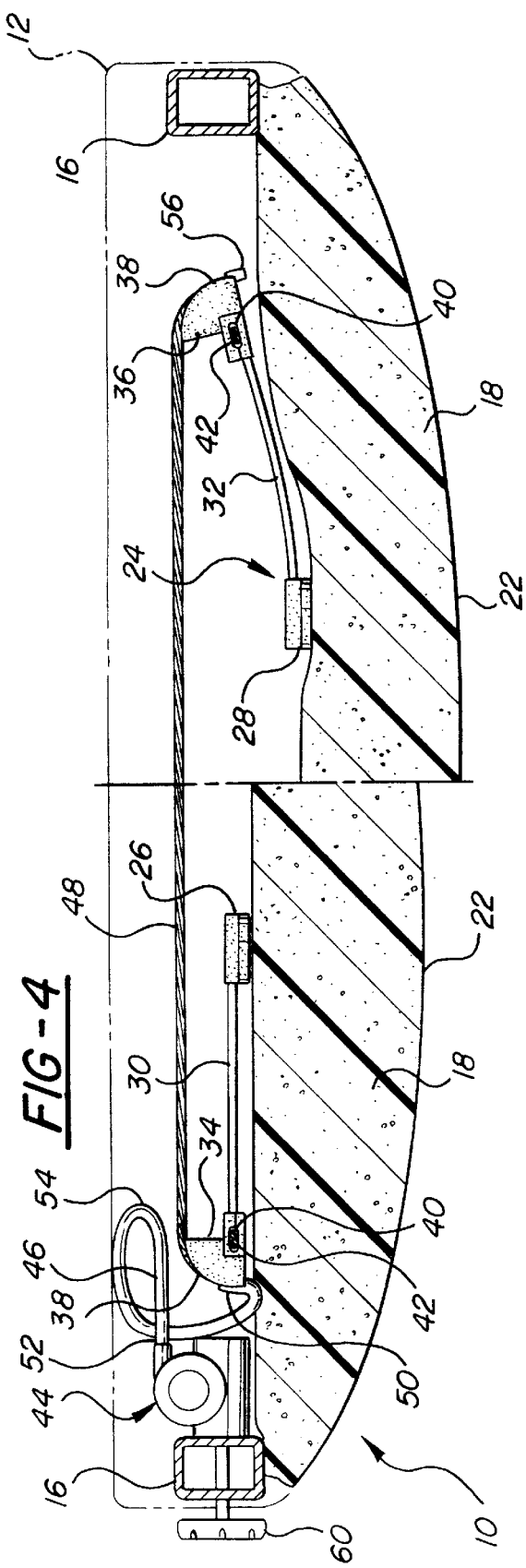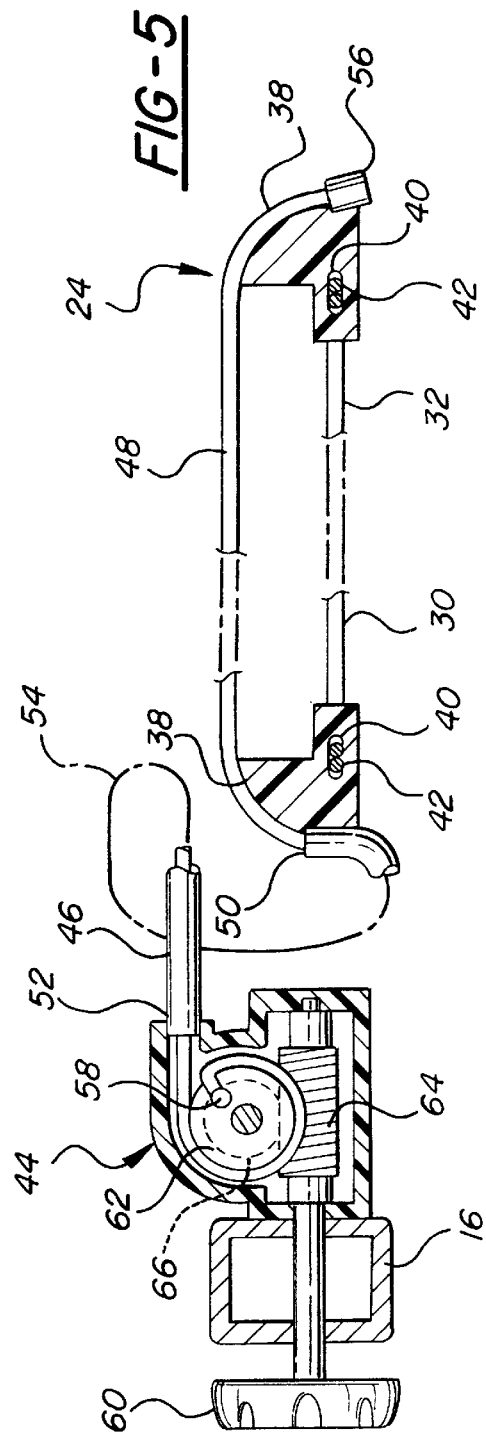

VEHICLE SEAT HAVING LUMBAR SUPPORT

BACKGROUND OF THE INVENTION

1. Field of the Invention

The subject invention relates generally to an adjustable lumbar support mechanism concealed within the backrest portion of a seat, and in particular a cable operated mechanism for use in an automobile seat assembly.

2. Description of Related Art

For ergonomic and therapeutic reasons, it is desirable to provide adjustable support to the lower lumbar region of a person's back when seated for long periods of time. As automobile driving often entails long seated periods with only limited movement, lumbar support mechanisms are a welcome addition to many automobile seat assemblies. The lumbar support mechanisms must be adjustable in view of the varying body sizes and shapes of automobile drivers and passengers, as well as the desire to alter one's seat conditions from time to time.

The prior art has advanced many types of adjustable lumbar support mechanisms for the automobile seat environment, including both manually adjusted and powered adjusted units. To help maintain costs low and weight down, manually adjusted lumbar support mechanisms are more often preferred over the powered versions. Examples of manually adjusted lumbar support mechanisms may be had by reference to U.S. Pat. No. 5,076,643, to Colasanti et al., issued Dec. 31, 1991, and U.S. Pat. No. 5,088,790, to Wainwright et al., issued Feb. 18, 1992, both assigned to the assignee of the subject invention, the disclosures of which are hereby incorporated by reference. While nearly all prior art manually adjusted lumbar support mechanisms function satisfactorily, there remains the ever-present desire to further reduce both cost and weight, while maintaining and/or increasing durability, functionality and assembly.

SUMMARY OF THE INVENTION

The subject invention comprises an automobile seat assembly including a backrest portion having a structural frame and a cover enveloping the frame. First and second applicator pads are supported within the cover of the backrest portion for generally synchronized movement toward respective extended positions applying outward pressure to the cover. A first crank is operatively connected to the first applicator pad, and a second crank is operatively connected to the second applicator pad. A conduit connects to the first crank, and a core element is slidably disposed within the conduit and connected to the second crank. The improvement of the subject invention comprises an actuator which simultaneously applies a tensile force along the core element and a complimentary compressive force along the conduit to move the first and second cranks and thereby displace the first and second applicator pads in unison against the cover, thus providing lumbar support to a seated occupant.

The subject invention also contemplates an adjustable lumbar support assembly for selectively applying pressure to the lower area of a seat backrest. The assembly comprises a first support wire, a second support wire spaced parallel from the first support wire, a first applicator pad pivotally supported on the first support wire, a second applicator pad pivotally supported on the second support wire, a first crank operatively connected to the first applicator pad, a second crank operatively connected to the second applicator pad, a conduit operatively connected to the first crank, and a core element slidably disposed within the conduit and operatively connected to the second crank. The improvement of the invention comprises an actuator operatively connected to the conduit and the core element for applying a tensile force along the core element and a complimentary compressive force along the conduit to simultaneously move the first and second cranks and thereby displace the first and second applicator pads in unison against the cover providing lumbar support to a seated occupant.

The subject actuator results in a manually adjusted lumbar support mechanism which is particularly inexpensive to construct and substantially lighter than the prior art designs. The subject design is also very durable and can be readily installed in most existing seat constructions.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an automobile seat assembly including the lumbar support assembly of the subject invention;

FIG. 2 is a perspective view of the internal frame structure of an automobile seat assembly including the lumbar support assembly of the subject invention operatively supported therein;

FIG. 3 is a fragmentary rear view of the actuator according to the subject invention;

FIG. 4 is a cross-sectional view taken generally along lines 4—4 of FIG. 1 and showing on the left half thereof the subject lumbar support assembly in a retracted condition and in an extended lumbar supporting condition on the right half thereof; and FIG. 5 is a cross-sectional view taken generally along lines 5—5 of FIG. 3 showing the subject lumbar support assembly.

DESCRIPTION OF THE PREFERRED EMBODIMENT

Referring to the Figures, wherein like numerals indicate like or corresponding parts throughout the several views, an automobile seat assembly is generally indicated at 10. The seat assembly 10 includes a generally vertical backrest portion 12 and a horizontal seat portion 14. The backrest portion 12 has a tubular frame 16 positioned along its inner periphery. The backrest portion 12 is filled with a foam-type cushion 18, which is supported within the frame 16 by a suspension mat-type wire mesh 20, as is known to those skilled in the art. The frame 16, cushion 18 and wire mesh 18 are all enveloped by a decorative cover 22 made of fabric, leather or other material. The wire mesh 20 is best shown in FIGS. 2 and 3.

A lumbar support assembly is generally shown at 24 in FIGS. 2–5 for selectively applying pressure to the lower area of the backrest portion 12. The lumbar support assembly 24 includes first 26 and second 28 applicator pads positioned beneath the fabric cover 22 and foam cushion 18 of the backrest portion 12. The first and second applicator pads 26, 28 are pivotally supported within the backrest portion 12 for generally synchronized movement toward an extended position (right half of FIG. 4) applying outward pressure to the cover 22. The first and second applicator pads 26, 28 are oriented so as to apply pressure on opposite sides of a seated occupant's spine, in the lower back region. The first and second applicator pads 26, 28 are each fabricated from a plastic material and include a plurality of apertures formed therein for weight and cost reduction purposes.

The first and second applicator pads 26, 28 each include an arm 30, 32, respectively, extending laterally therefrom. The arms 30, 32 each comprise a pair of rod-like beams are fabricated from a heavy gauge wire material. In the preferred embodiment shown in the Figures, the applicator pads 26, 28 are rigidly connected to the arms 30, 32. However, those skilled in the art will readily appreciate that in an alternative embodiment the applicator pads 26, 28 may be articulated or otherwise flexibly connected to the arms 30, 32.

As shown in FIGS. 2–5, the arms 30, 32 are fixedly connected to respective first and second cranks 34, 36. Therefore, the first crank 34 is operatively connected to the first applicator pad 26 and the second crank 36 is operatively connected to the second applicator pad 28. The two cranks 34, 36 are identical in construction, thereby minimizing production, tooling and inventory costs, and are preferably fabricated from a durable plastic material. Each crank 34, 36 includes an arcuate (or otherwise rounded) rim 38 which is grooved much like the rim of a pulley sheave. The cranks 34, 36 are independently supported for movement upon a bearing surface 40, which surrounds a vertically extending axle section 42 of wire(s) in the wire mesh 20. The bearing surface 40 permits either relative rotation between the cranks 34, 36 and the axle section 42 of the wire mesh 20, or as in the case of the embodiment as shown in FIGS. 3–5 the bearing surface 40 non-rotatably grips a pair of side-by-side wires, thereby using the inherent torsion spring properties of the wires. In either case, each crank 34, 36 is independently pivotal about an axis (generally vertical) defined by the axle section 42 of the wire(s) of the wire mesh 20. As each crank 34, 36 pivots, its associated arm 30, 32 and connected applicator pad 26, 28 swings an arc either toward or away from the lower back of an occupant seated in the seat assembly 10.

Those skilled in the art will appreciate that in an alternative embodiment, the cranks 34, 36 can be supported for rotation on a yoke-like support or other feature of the frame 16, instead of the wire mesh 20. In this application (not shown), the lumbar support assembly is fully independent of the wire mesh 20.

An actuator, generally indicated at 44 in FIGS. 1–5, is provided for selectively manipulating the applicator pads 26, 28 so that an occupant can adjust the amount and degree of lumbar support. The actuator 44 may take any general form, including electric motor and/or pressurized fluid power assisted, as will become apparent to those skilled in the art. However, the actuator 44 preferably comprises a manual input device described in detail below.

A flexible motion transmitting remote control assembly transmits motion and forces between the cranks 34, 36 and the actuator 44. The motion transmitting remote control assembly includes a sheath-like conduit 46 which slidably supports an internal moving core element 48. The conduit 46 may be of the composite type having an inner tubular liner defining the internal boundaries of a core passage, at least one metallic supportive lay wire wrapped helically about the liner, and an outer cover disposed about the lay wire. However, any such conduit construction or Bowden-type actuator will perform satisfactorily. The core element 48 may be either a single wire or a plurality of wire filaments wrapped helically to form a single motion transmitter.

The conduit 46 includes one end 50 operatively connected to the first crank 34, in a pocket thereof. The connection between the one end 50 of the conduit 46 and the first crank 34 allows compressive forces to be transferred therebetween and resists disconnection. An opposite end 52 of the conduit 46 is operatively connected to a housing of the actuator 44, as by a clamp or other such fastener. A curved section 54 forms in the conduit 46 between the actuator 44 and the first crank 34. In order for the applicator pads 26, 28 to properly pivot upon manipulation of the actuator 44, there must be an unrestrained bow 54 in the conduit 46, as will be more fully described below.

One end of the core element 48 is operatively connected to the second crank 36 via a slug 56 seated in a corresponding notch, as best shown in FIG. 5. The other end 58 of the core element 48 is operatively connected to the actuator 44, such that manipulation of the actuator 44 causes displacement of the core element 48 within the conduit 46. Referring to FIGS. 3–5, the core element 48 is shown extending unsheathed from the one end 50 of the conduit 46, around the rim 38 of the first crank 34, through the interior of the backrest portion 12, around the rim 38 of the second crank 36, and finally to the slug 56. The core element 48 slides over the rim 38 of the first crank 34, and imparts no significant forces thereto.

The actuator 44 functions by applying a tensile force along the core element 48 and at the same time a complimentary compressive reaction force along the conduit 46. This contemporaneous pulling force on the core element 48 and pushing force on the conduit 46 simultaneously rotates the first 34 and second 36 cranks and thereby displaces the first 26 and second 28 applicator pads in unison against the cover 22 to provide lumbar support to a seated occupant. The compressive force is generated along the conduit 46 by a reaction of the curved section 54 tending to straighten out as the core element 48 is tensioned. As a result, the compressive forces are met with immovable resistance at the end 52 anchored to the housing of the actuator 44, via its attachment to the frame 16, while the end 50 butted against the first crank 34 is yieldable via the bearing surface 40 axle section 42 interface.

As stated above, the actuator 44 preferably includes a manual input device. The manual input device may include a twist knob 60, and a drum 62 operatively disposed between the one end 58 core element 48 and the twist knob 60. The twist knob 60 includes a worm gear 64 and the drum 62 includes gear teeth 66 operatively meshing with the worm gear 64. Rotation of the twist knob 60 drives the drum 62, which in turn winds and unwinds the core element 48 depending upon direction of rotation. This results in an increase or decrease in the tensile forces applied to the core element 48. Changes in the mechanical advantage of the twist knob 60 can be effected by varying the pitch of the worm gear 64 and/or the pitch circle diameter of the drum gear teeth 66.

In operation, the applicator pads 26, 28 are at the unactuated position shown in the left half of FIG. 4. When the occupant desires to increase the level of pressure exerted by the applicator pads 26, 28, he or she rotates the twist knob 60 any desired number of revolutions within the range of movement of the components. This causes the core element 48 to begin pulling the second crank 36 via the abutment of the slug 56. This, in turn, pivots the second crank 36 about its wire axle 42 in a clockwise direction as viewed from the right half of FIG. 4, and swings the associated applicator pad 28 into pressing engagement with the occupant's lower back. As the core element 48 is tensioned, and effectively shortened, the bowed section 54 of the conduit 46 is urged to straighten itself. This action of the conduit 46 results in a compressive force being transmitted along its length, thereby reacting against the first crank 34 and causing it to pivot in the counter clockwise direction, thus swinging its associated applicator pad 26 into pressing engagement with the occupant's lower back.

Accordingly, both applicator pads 26, 28 swing simultaneously into the lower back region of the occupant as the actuator 44 is manipulated. The actuator 44 restrains the core element 48 relative to the conduit 46, via the worm gear 64 arrangement, thus effectively locking the applicator pads 26, 28 in any displaced position. When it is desired to return the applicator pads 26, 28 to their unactuated position (as shown in the left half of FIG. 4), the twist knob 60 is rotated in the reverse direction while the occupant gently leans rearwardly against the applicator pads 26, 28, thereby forcing the system to return to its home condition.

The lumbar support assembly can be adapted to provide a range of responsiveness to the occupant. For example, by altering the length of the arms 30, 32 and the shape/size of the applicator pads 26, 28, different comfort responses can be achieved. Likewise, by moving the assembly vertically relative seat frame 16, variations in the comfort can be realized. Furthermore, by altering the material and/or diameter of the arms 30, 32, it is possible to increase or decrease their rigidity. In some applications, it may be desirable to limit flexibility of the arms 30, 32, whereas in other situations a high degree of flexibility may be preferred. Similarly, the position of the arms 30, 32 relative to their respective applicator pads 26, 28 has an effect on the flexibility within and along each of the applicator pads 26, 28. For example, in the preferred embodiment, the uppermost and lowermost regions of the applicator pads 26, 28 will likely experience some deflection during use. If this is undesirable, the respective pairs of arms 30, 32 can be spread apart further to more fully reinforce the associated applicator pads 26, 28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An automotive seat assembly comprising:
   a backrest portion having a structural frame and a cover enveloping said frame;
   first and second applicator pads supported within said cover of said backrest portion for generally synchronized movement toward respective extended positions applying outward pressure to said cover;
   a first crank operatively connected to said first applicator pad;
   a second crank operatively connected to said second applicator pad;
   a conduit operatively connected to said first crank, said conduit having a curved section;
   a core element slidably disposed within said conduit and operatively connected to said second crank; and
   an actuator operatively connected to said conduit and said core element, for applying a tensile force along said core element,
   wherein the curved section of said conduit causes a compressive force along said conduit to move said first crank as the tensile force is applied to said core element to move said second crank, thereby displacing said first and second applicator pads against said cover to provide lumbar support to a seated occupant.

2. An assembly as set forth in claim 1 wherein said first and second cranks each include a grooved arcuate surface.

3. An assembly as set forth in claim 1 wherein said first and second cranks each include a bearing surface, and said frame includes respective axle supports for engaging said bearing surfaces.

4. An assembly as set forth in claim 3 wherein said frame includes a wire mesh supported within said cover of said backrest.

5. An assembly as set forth in claim 4 wherein said axle supports comprise vertically extending sections of said wire mesh.

6. An assembly as set forth in claim 1 wherein said first and second applicator pads include an arm extending laterally to said respective.

7. An assembly as set forth in claim 6 wherein said arm of each of said first and second applicator pads comprises a pair of beams.

8. An assembly as set forth in claim 6 wherein said actuator includes a manual input device.

9. An assembly as set forth in claim 8 wherein said manual input device includes a twist knob.

10. An assembly as set forth in claim 9 wherein said actuator includes a drum operatively disposed between said core element and said twist knob.

11. An assembly as set forth in claim 10 wherein said twist knob includes a worm gear and said drum includes gear teeth operatively meshing with said worm gear.

12. An assembly as set forth in claim 1 wherein said first and second applicator pads are each fabricated from a plastic material and include a plurality of apertures formed therein.

13. An assembly ass et forth in claim 1 wherein said backrest includes a cushion disposed between said first and second applicator pads and said cover.

14. An adjustable lumbar support assembly for selectively applying pressure to a lower area of a seat backrest, said assembly comprising:
   a first support wire;
   a second support wire spaced parallel from said first support wire;
   a first applicator pad pivotally supported on said first support wire;
   a second applicator pad pivotally supported on said second support wire;
   a first crank operatively connected to said first applicator pad;
   a second crank operatively connected said second applicator pad;
   a conduit operatively connected to said first crank, said conduit having a curved section;
   a core element slidably disposed within said conduit and operatively connected said second crank; and
   an actuator operatively connected to said conduit and said core element for applying a tensile force along said core element,
   wherein the curved section of said conduit causes a compressive force along said conduit to move said first crank as the tensile force is applied to said core element to move said second crank, thereby displacing said first and second applicator pads against the lower area of the seat backrest to provide lumbar support to a seated occupant.

15. An assembly as set forth in claim 14 wherein said first and second cranks each include a grooved arcuate surface.

16. An assembly as set forth in claim 14 wherein said first and second applicator pads include an arm extending laterally to said respective first and second crank.

17. An assembly as set forth in claim 16 wherein said arm of each of said first and second applicator pads comprises a pair of beams.

18. An assembly as set forth in claim 14 wherein said actuator includes a twist knob having a drum operatively engaging said core element.

19. An assembly as set forth in claim 18 wherein said twist knob includes a worm gear and said drum includes gear teeth operatively meshing with said worm gear.

20. An adjustable lumbar support assembly for selectively applying pressure to a lower area of a seat backrest, said assembly, comprising:

a backrest portion having a structural frame and a cover enveloping said frame;

first and second applicator pads supported within said cover of said backrest portion;

a first crank operatively connected to said first applicator pad;

a second crank operatively connected to said second applicator pad;

a conduit operatively connected to said first crank, said conduit having a curved section;

a core element slidably disposed within said conduit and operatively connected to said second crank; and an actuator operatively connected to said conduit and said core element, wherein applying an increase in a tensile force along said core element by said actuator causes the curved section of said conduit to increase a compressive force along said conduit, thereby causing said first and second cranks to increase a pressure applied by said first and second applicator pads against the lower area of the seat backrest, and wherein applying a decease in the tensile force along said core element by said actuator causes the curved section of said conduit to decrease the compressive force along said conduit, thereby causing said first and second cranks to decrease the pressure applied by said first and second applicator pads against the lower area of the seat backrest.

* * * * *